United States Patent

Picca et al.

[11] Patent Number: 5,957,590
[45] Date of Patent: Sep. 28, 1999

[54] PROVISIONAL RETAINING AND SEALING DEVICE FOR BALL BEARINGS

[75] Inventors: Mauro Picca, Perosa Argentina; Luciano Pons, Pinerolo; Angelo Vignotto, Turin, all of Italy

[73] Assignee: SKF Industries S.p.A., Torino, Italy

[21] Appl. No.: 08/974,991

[22] Filed: Nov. 20, 1997

Related U.S. Application Data

[63] Continuation of application No. 08/819,209, Mar. 17, 1997, abandoned.

[30] Foreign Application Priority Data

Mar. 22, 1996 [IT] Italy .................................. TO96A0220

[51] Int. Cl.$^6$ ............................. F16C 41/04; F16C 33/76; F16C 43/04
[52] U.S. Cl. .......................... 384/448; 384/486; 384/512; 384/539; 384/544
[58] Field of Search .................................... 384/448, 477, 384/484, 485, 486, 499, 504, 506, 507, 510, 512, 539, 543, 544

[56] References Cited

U.S. PATENT DOCUMENTS

| | | | |
|---|---|---|---|
| 4,398,775 | 8/1983 | Hofmann et al. | 384/484 |
| 4,708,497 | 11/1987 | Lederman | 384/448 |
| 5,051,003 | 9/1991 | Sasayama | 384/477 |
| 5,051,004 | 9/1991 | Takeuchi et al. | 384/512 X |
| 5,193,917 | 3/1993 | Adler et al. | 384/539 X |
| 5,215,387 | 6/1993 | Bertetti et al. | 384/544 |

FOREIGN PATENT DOCUMENTS

| | | |
|---|---|---|
| 0 156 552 | 10/1985 | European Pat. Off. . |
| 70 34 015 | 9/1970 | Germany . |
| 43 38 261 | 5/1994 | Germany . |
| TO 94A 000596 | 7/1994 | Italy . |
| 2 207 470 | 2/1989 | United Kingdom . |

*Primary Examiner*—Thomas R. Hannon
*Attorney, Agent, or Firm*—Merchant & Gould P.C.

[57] ABSTRACT

In a sealing device for angular contact ball bearings comprises an outer race (20), a pair of inner adjacent half-races (30, 31) and two sets of balls (40, 41) interposed between the outer race (20) and the two inner half-races (30, 31), respectively. The sealing device is mounted to one (30) of the two inner half-races (30, 31) in an axially external position and comprises a body of resiliently yieldable material. The sealing device comprises a retaining lip (14) so shaped as to face a concave surface (22) fast with the outer race (20) and stop against said surface (22) to prevent the inner half-race (30) from coming off when not locked in its operation position yet.

8 Claims, 1 Drawing Sheet

PROVISIONAL RETAINING AND SEALING DEVICE FOR BALL BEARINGS

This is a continuation of application Ser. No. 08/819,209, filed Mar. 17, 1997, now abandoned.

FIELD OF THE INVENTION

The present invention falls within the field of ball bearings for motor vehicle wheel hubs. Particularly, the invention relates to angular contact ball bearings of the kind wherein the inner race is composed of two adjacent half-races, each acting on a respective set of bearing balls. More particularly, the present invention concerns a provisional retaining and sealing device for the above kind of bearings.

BACKGROUND OF THE INVENTION

With the above cited kind of bearings, it has to be avoided that the radially inner half-races come loose during the bearing transfer and assembly operations, as well as while the assembled bearing is mounted on the vehicle wheel hub.

Known systems provide a provisional retaining means such as discussed in the introductory part of Italian Patent application No. TO94A000596, to the same Applicant. Such solutions have a drawback in that costly additional operations are required in order to machine suitable retaining seats in the bearing half-races to allow engagement of said provisional retaining means. Or, costly apparatuses have to be specifically implemented for handling such provisional retaining means. In some cases, besides being costly, said additional machining operations have the further drawback of weakening the half-races.

SUMMARY OF THE INVENTION

It is an object of the present invention to provide an improved device capable of overcoming the above prior art drawbacks.

In accordance with one aspect of the invention as claimed, these objects are accomplished by the provision of a sealing device for angular contact ball bearings comprising an outer race, a pair of inner adjacent half-races and two sets of balls interposed between the outer race and the two inner half-races, respectively. The sealing device is mounted to at least one of the two inner half-races in an axially external position and comprises a body of resiliently yieldable material. The device is characterised by comprising at least one retaining lip so shaped as to face a surface fast with the outer race and stop against said surface to prevent the inner half-race from coming off when not locked in its operation position yet.

BRIEF DESCRIPTION OF THE DRAWINGS

In order that the present invention may be well understood there will now be described a preferred embodiment thereof, given by way of example, reference being made to the accompanying drawings, in which.

DETAILED DESCRIPTION OF A PREFERRED EMBODIMENT

Figure 1:
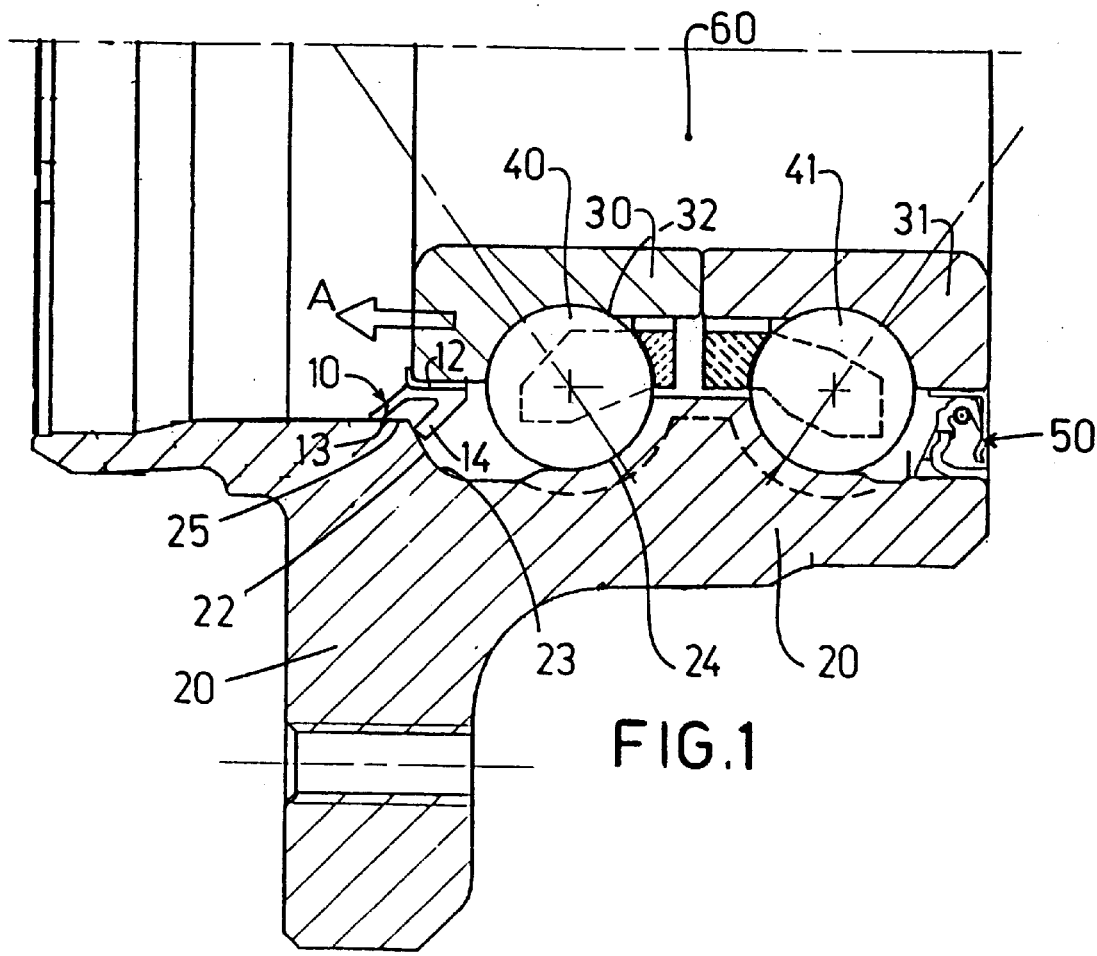
FIG. 1 is a partial axial cross-sectional view of a bearing fitted with a device according to the present invention.

With reference initially to FIG. 1, numeral 10 designates overall a sealing device in accordance with the present inventions. The sealing device 10 is adapted for mounting on conventional angular contact ball bearing assemblies comprising an outer race 20, a pair of inner adjacent half-races 30, 31, and two sets of balls 40, 41 each interposed between the outer race 20 and the two inner half-races 30, 31, respectively. The sealing device 10 is mounted to the half-race 30 which in use is disposed towards the outside of the vehicle, obviously at the axially outer face of this half-race. Sealing action on the other side, involving the other half-race 31, is attained by a conventional sealing device such as, for example, the one designated at 50 and illustrated in FIG. 1.

The arrangement shown in FIG. 1 is the operational one. Wherein the two radially inner half-races are axially tightened one against the other, generally by means of a threaded fastening bolt member (not shown for simplicity) inserted through the inner cavity 60 of the two half-races. In this condition, the two sets of balls 40, 41 steadily engage their respective bearing races.

As discussed in the introductory part of the description, it is during the transitional phases of assembling and mounting of the bearing, i.e. when the above cited fastening member has not been fixed yet, that it is desired to prevent the half-race 30 from accidentally slipping off in the direction indicated by arrow A in FIG. 1; this would mean that the outer set 40 of bearing balls would fall out and be lost.

Figure 2:
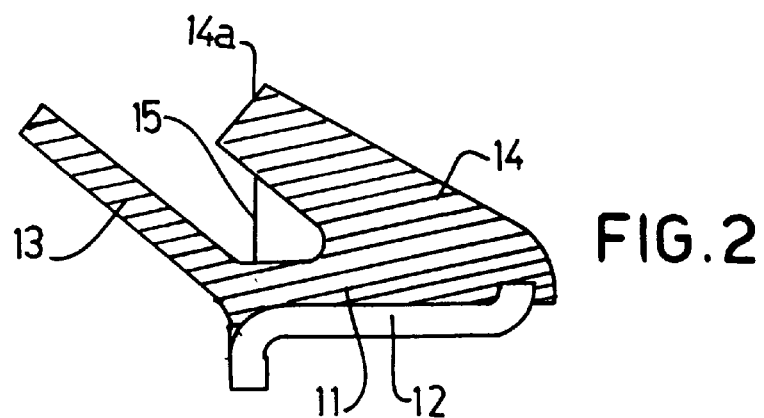
FIG. 2 is an enlarged view of the part of FIG. 1 showing the device of this invention in detail.

With reference also to FIG. 2, the sealing device 10 of the present invention comprises a body 11 of resiliently yieldable material securely attached to a metal supporting insert 12. Supporting insert 12 is interference fitted or permanently fixed in other ways proximate to the axially outer periphery of half-race 30.

Body 11 of resiliently yieldable material comprises a first, outer flexible sealing lip 13 adapted to engage in sliding contact an opposed surface 21 integral or fast with the radially outer race 20 of the bearing (FIG. 1), and a second retaining lip 14 located in an axially inner position relative to the first sealing lip 13. The second lip 14 is oriented towards a surface 22 integral or fast with outer race 20.

The retaining lip 14 must be so shaped as to face surface 22 and abut against this facing surface to prevent the inner half-race from coming off (moving in the direction of arrow A) during the above mentioned transitional phases.

In the preferred embodiment shown in the drawings, retaining lip 14 has a substantially axial truncated cone shape diverging towards the outside of the bearing. Lip 14 is able to stop against the concave surface 22. In this way, the half-race 30 is prevented from coming off and the bearing ball being lost.

Those skilled in the art will understand that the disclosed arrangement is not limiting and that various modifications may be designed, e.g. changing the angle or the length of the retaining lip 14.

In a preferred form, the length of the second lip 14 is such that during operation no sliding contact takes place between the end 14a of this lip and the opposed surface 22. However, it is preferred that the end 14a is close to surface 22 in operation to exert a labyrinth sealing action which is added to the main sealing action performed by the sliding lip 13.

The rigidity of retaining lip 14 depends on the hardness of the compound of the material forming body 11, and the length to width ratio of lip 14. Still with reference to FIG. 2, in the preferred embodiment shown there is provided a plurality of stiffening radial ribs 15 suitably spaced. These ribs are effective in contrasting the bending of retaining lip 14 in the axial plane.

It will be appreciated that a single rubber body performs the dual function of sealing (both sliding and labyrinth sealing action) as well as preventive retaining during handling and assembly phases. The advantages given by the retaining lip 14 are attained at irrelevant additional costs.

As to the assembling of the bearing, before the outer half-race 30 is mounted, the balls 40 are provisionally located in a groove 23 slightly deeper than and adjacent to the race surface 24. The half-race 30 is then inserted in the direction opposite to that of arrow A. The step 32 is allowed to pass beyond the top of the balls fitted in groove 23 and so reach its operation position while pushing the balls on their race surface 24. obviously, groove 23 must not be so deep as to define with step 32 a passage wider than the diameter of the bearing balls.

The sealing device 10 may be mounted beforehand to the half-race 30. In fitting the latter, lip 14 will snap into groove 23 and prevent said half-race from coming off.

We claim:

1. A sealing device for angular contact ball bearings comprising an outer race (20), a pair of inner adjacent half-races (30, 31) and two sets of balls (40, 41) interposed between the outer race (20) and the two inner half-races (30, 31), respectively; the sealing device being mounted to at least one (30) of the two inner half-races (30, 31) in an axially external position and comprising a body of resiliently yieldable material, characterised by comprising at least one retaining lip (14) so shaped as to face a surface (22) fast with the outer race (20) and stop against said surface (22) to prevent the inner half-race (30) from coming off when not locked in its operation position yet.

2. The device set forth in claim 1, characterised in that the retaining lip is so shaped as to skim said surface (22) in the operation position to perform labyrinth sealing action.

3. The device set forth in claim 1, characterised in that it comprises at least one further sealing lip (13) adapted to engage in sliding contact a surface (21) fast with the outer race (20).

4. The device set forth in claim 3, characterised in that the retaining lip (14) is located in an axially inner position relative to said sealing lip (13).

5. The device set forth in claim 1, characterised in that the lip (14) has a truncated cone axial shape diverging towards the outside of the bearing.

6. The device set forth in claim 1, characterised in that said surface (22) is concave, the concavity being directed towards the end (14*a*) of the retaining lip (14).

7. The device set forth in claim 1, characterised in that said retaining lip (14) is provided a plurality of stiffening radial ribs (15) for contrasting the bending of retaining lip (14) in the axial plane.

8. The device set forth in claim 1, characterised in that the axially outer race (20) forms a groove (23) adjacent to the race surface (24) of the axially outer set of balls (40), the depth of said groove (23) being such as to define with the axially outer, radially inner half race (30) a passage wider than the diameter of the bearing balls.

* * * * *

UNITED STATES PATENT AND TRADEMARK OFFICE
CERTIFICATE OF CORRECTION

PATENT NO. : 5,957,590
DATED : SEPTEMBER 28, 1999
INVENTOR(S) : PICCA ET AL.

It is certified that error appears in the above-identified patent and that said Letters Patent is hereby corrected as shown below:

Front page, [75] Inventors: "Turin" should read --Torino--

Front page, [73], Assignee: "SKF Industries S.p.A." should read --SKF Industrie S.P.A.--

Col. 1, line 67: "inventions" should read --invention--

Signed and Sealed this

First Day of May, 2001

*Attest:*

NICHOLAS P. GODICI

*Attesting Officer*  *Acting Director of the United States Patent and Trademark Office*